May 5, 1925.

W. H. KIZER

FLANGED UNION CHECK VALVE

Filed June 21, 1924

1,536,869

INVENTOR.
William H. Kizer;
BY
Geo. P. Kimmel.
ATTORNEY.

Patented May 5, 1925.

1,536,869

UNITED STATES PATENT OFFICE.

WILLIAM H. KIZER, OF BEGGS, OKLAHOMA.

FLANGED UNION CHECK VALVE.

Application filed June 21, 1924. Serial No. 721,557.

*To all whom it may concern:*

Be it known that I, WILLIAM H. KIZER, a citizen of the United States, residing at Beggs, in the county of Okmulgee and State of Oklahoma, have invented certain new and useful Improvements in Flanged Union Check Valves, of which the following is a specification.

This invention relates to valve structures and pertains particularly to the class of flanged union check valves.

In the oil fields, pipe lines running oil or other liquid are connected together by means of flanged unions and these flanged unions usually have therebetween valves to check any backward flow of the liquid in the pipe line. The present custom is to place the valve inside of or between the sections of the flanged union in such a manner that if there should be a break in the union, the valve will become useless and there is nothing to prevent the backward flow of oil or other liquid. It is especially important that provision be made to check the backward flow of oil through these unions where the same are used to couple supply or feed pipe lines to a main line, for, should one of the supply or feed pipe lines have the coupling between it and the main line broken, the oil from the main line would run off at the union and thus be lost.

The primary object of this invention is the provision, in a manner as hereinafter set forth, of a flanged union provided with a check valve built into the union or one section thereof in such a manner that should the union become broken, the pressure of the backflowing oil or the oil from the main line to which the union couples a supply pipe, would be checked by the automatic closing of the valve therein and thus all waste from the main line would be prevented.

This invention contemplates the provision of a flanged union comprising two sections, each in the form of a circular plate having extended from one face an interiorly threaded collar, the other faces being secured together by means of bolts passing through the plate about the outer portion thereof, and the abutting faces are so formed that an interlocking leaktight joint is made therebetween. The collars and plates have central or axial passages therethrough, and within one of the collars a flange is built up about the axial passage to provide a valve seat and a pivoted flap valve is secured within this collar and adapted to seat upon the rim of the said flange. Thus when the two sections are bolted together and pipe connections made with the collar of each section, a leakproof connection is set up and the valve within one of the collars is adapted to open in one direction only to allow the fluid to pass therethrough. Should the sections become broken apart, the flap valve would still be retained uninjured in one of the sections and the pressure of the backflowing fluid would close the same against the rim referred to, to close the outlet and thus prevent the escape of any of the oil or other liquid which is being conveyed through the pipes.

A further and final object of this invention is the provision, in a manner as hereinafter set forth, of a flanged union check valve having a minimum number of parts, of strong and sturdy construction, easily set up and placed in position, and inexpensive to manufacture.

The invention will be best understood from a consideration of the following detailed description taken in connection with the accompanying drawings forming part of this specification, with the understanding that the invention is not confined to any strict conformity with the showing of the drawings, but may be changed and modified so long as such changes and modifications mark no material departure from the salient features of the invention as expressed in the appended claims.

Figure 1:
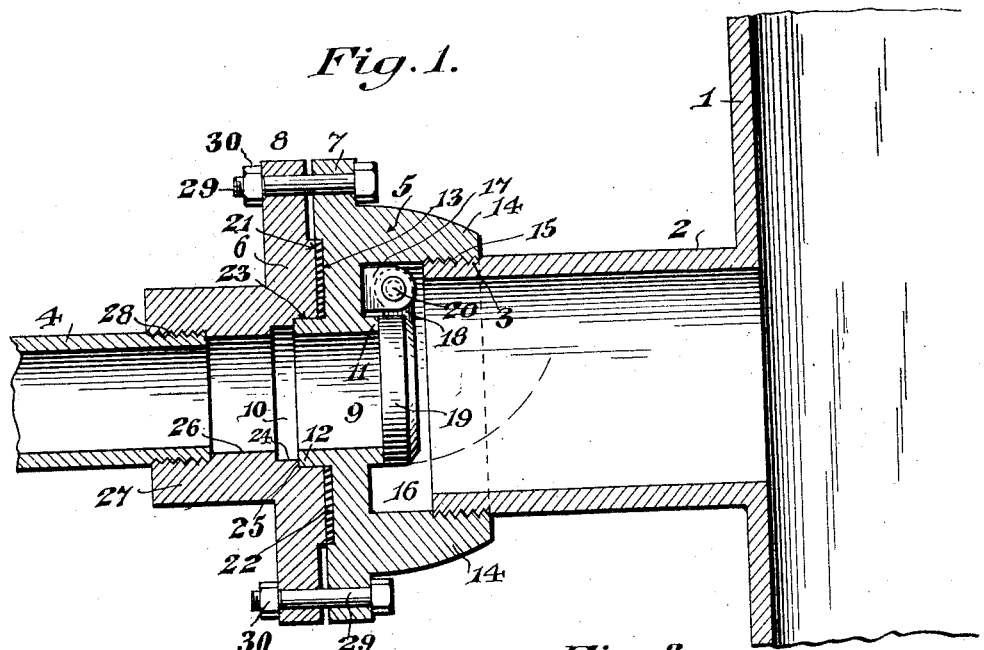
Figure 1 is a longitudinal sectional view through the device embodying this invention showing the same as connecting a supply line with a main line.
Figure 2:
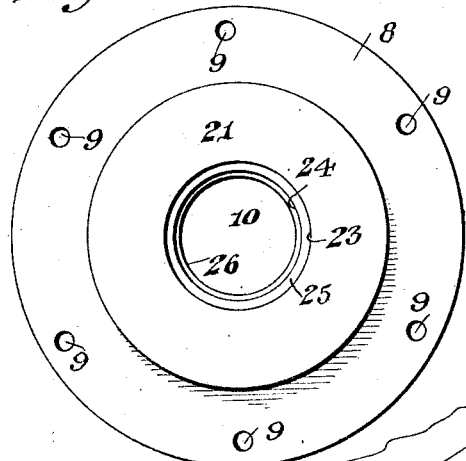
Figure 2 is a plan view of the abutting face of one of the sections.
Figure 3:
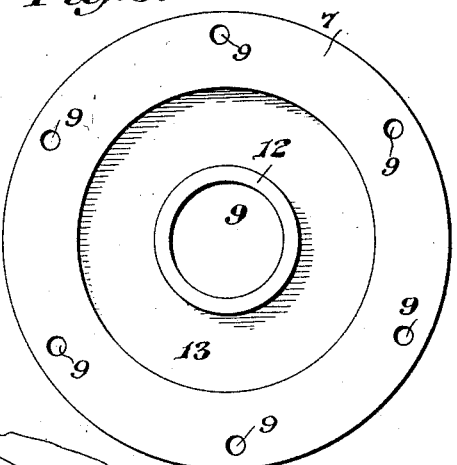
Figure 3 is a plan view of the abutting face of the other section.
Figure 4:
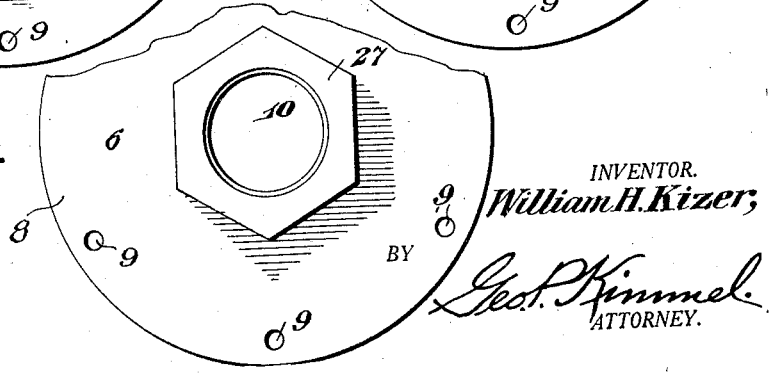
Figure 4 is a view of the outer side of that portion in which the small or supply pipe is connected.

Referring now to the drawings in detail, wherein like numerals of reference indicate corresponding parts throughout the several views, numeral 1 indicates a main pipe line having a lead-in pipe 2 connected therewith, the outer end of which is peripherally threaded as at 3, and numeral 4 indicates a feed line pipe through which a fluid may be fed to the main line 1.

The device embodying this invention comprises two members, each indicated as a whole by the numerals 5 and 6, respectively. These sections comprise circular plates 7 and 8, respectively, each provided with the annular series of bolt holes 9 extending therethrough and adjacent the periphery thereof.

The plate 7 of the section 5 has an axial passage 9 therethrough and the plate 8 of the section 6 has a similar passage 10 therethrough. The inner and outer face of the plate 7 has the annular collars 11 and 12, respectively, formed integrally therewith, thus elongating the passage 9 through the plate as shown. The face of the plate 7 further has a gasket retaining recess 13 formed therein adjacent the outer side of the collar 12.

Extending from the outer face of the plate 7 is an annular valve enclosing and pipe engaging collar 14 interiorly threaded as at 15 to receive one end of a pipe, of a pipe line, such as the extension 2 of the main line 1. This collar 14 is of relatively large internal diameter, and therefore there is a space remaining between the inner wall of the collar 14 and the central collar 11 as at 16.

Within the space 16 there is provided a pair of spaced apertured lugs 17 (one only being shown in the view), and between these spaced lugs an ear 18 of a flap valve 19 is pivotally secured by means of the pivot pin 20. This flap valve 19 as shown in Figure 1 seats upon the rim of the collar 11 within the enclosing collar 14.

The plate 8 of the section 6 has formed upon the inner face thereof the outstanding annular rib 21 of the same width as the recess 13 and adapted to fit therein and retain in position in the recess 13 the gasket 22. The axial bore or passage through the plate 8 has an outer portion of large diameter as indicated at 23 adapted to have fitted therein the collar 12 formed upon the inner face of the plate 7. The bore is further formed to provide the intermediate portion 24 of less diameter than the portion 23 to provide the abutting shoulders 25 for the rim of the collar 12, and an inner portion of still less diameter than the portions 23 and 24, as indicated at 26, this portion extending through the polygonal shaped collar 27 extending from the outer face of the plate 8. This collar 27 is interiorly threaded as at 28 to receive the threaded end of the supply pipe 4.

The collars 14 and 27 have been here shown as of different diameter, but it is understood that the same may be of any desired diameter, as they may be alike to connect pipe sections of the same size.

When the two sections are in position as shown in Figure 1, with the inner faces of the plates 7 and 8 abutting and the flange 21 resting against the gasket 22 carried in the recess 13, the apertures 9 in the plates will be aligned and the bolts 29 passed therethrough and secured by the nuts 30 to draw the sections tightly together. This may be done before the pipes to be united are threaded into the collars 14 and 27 or the collars 14 and 27 may have pipes 2 and 4 threaded thereinto before the plate 7 and 8 are bolted together.

From the foregoing description it may be seen that the improved flanged union check valve here set forth is a decided improvement over the flanged unions at present in use, for should either of the plates 7 or 8 break or in any way come apart, the valve 19, which can only open in the direction indicated by the arrow, would be closed instantly by the back pressure of the fluid in the main pipe line 1 and thus prevent the escape of any of that fluid from the line.

Having thus described my invention what I claim is:

1. A union of the character set forth, comprising a pair of centrally apertured abutting plates one having an annular recess in the abutting face thereof, an annular rib on the abutting face of the other plate seating in said recess, a pair of annular aligned collars upon each face of said recessed plate in alignment with the aperture therethrough, that collar upon the abutting face extending into and seating in the aperture in the adjacent plate, a flange upon the outer face of each plate, that flange upon said recessed plate being of materially greater diameter than the flange upon the other plate, a flap valve mounted upon the body of the plate having the flange of greater diameter, within the flange and seating upon the end of the adjacent collar to close the aperture through the plate, and means for securing the plates together.

2. A union of the character set forth, comprising a pair of centrally apertured abutting plates one having an annular recess in the abutting face thereof, an annular rib on the abutting face of the other plate seating in said recess, a pair of annular collars upon each face of said recessed plate in alignment with the aperture therethrough, that collar upon the abutting face extending into and seating in the aperture in the adjacent plate and further constituting one wall of said recess, said annular rib engaging snugly over the last mentioned collar to set up a leak proof joint between the plates, a flange upon the outer face of each plate, that flange upon said recessed plate being of materially greater diameter than the flange upon the other plate, a flap valve mounted upon the body of the plate having the flange of greatest diameter, within the flange and seating upon the end of the adjacent collar, to close the aperture through the plate, and means for securing the plates together.

In testimony whereof, I affix my signature hereto.

WILLIAM H. KIZER.